Figure 1:
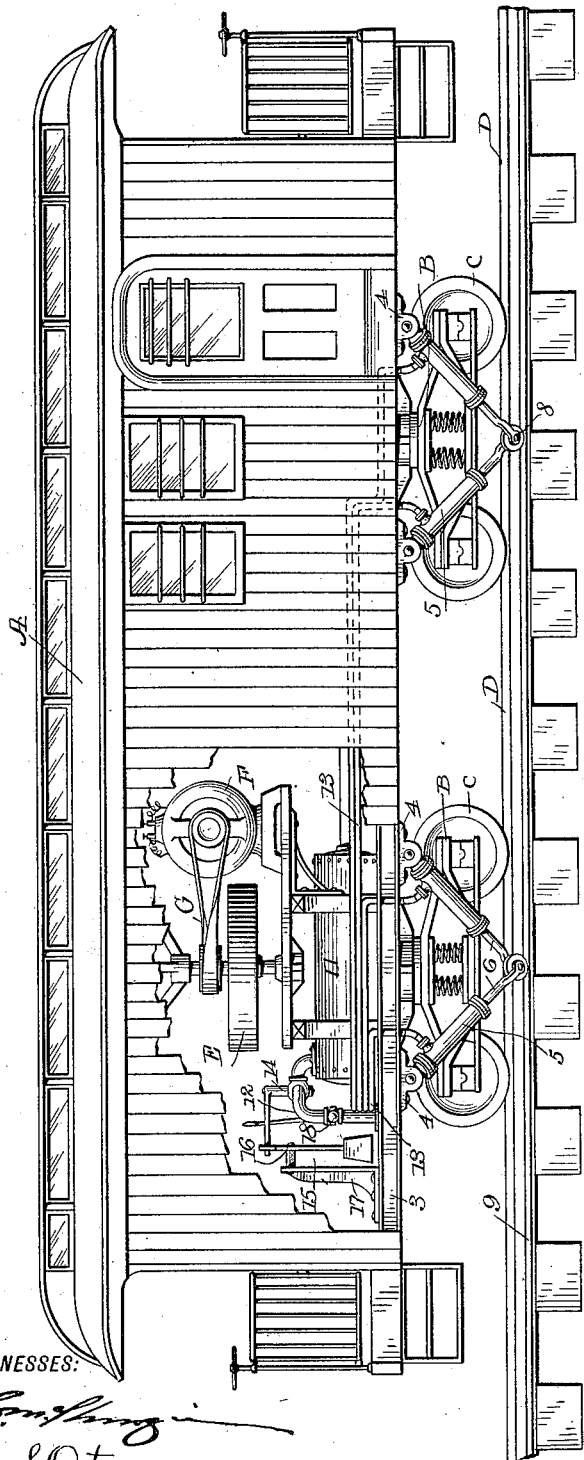

R. F. CORDERO.
SAFETY DEVICE FOR MONORAILS.
APPLICATION FILED APR. 6, 1911.

1,015,140.

Patented Jan. 16, 1912.

2 SHEETS—SHEET 1.

WITNESSES:

INVENTOR
Ramon Febres Cordero

BY
ATTORNEYS

R. F. CORDERO.
SAFETY DEVICE FOR MONORAILS.
APPLICATION FILED APR. 6, 1911.
1,015,140.
Patented Jan. 16, 1912.
2 SHEETS—SHEET 2.
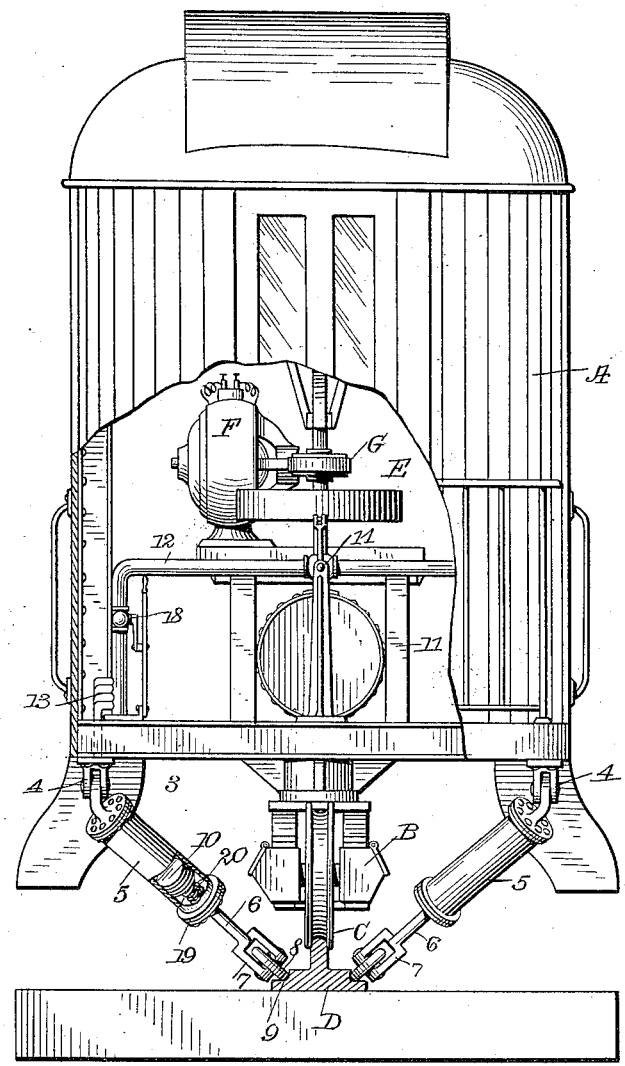
Fig. 2.
WITNESSES:
Fig. 3.
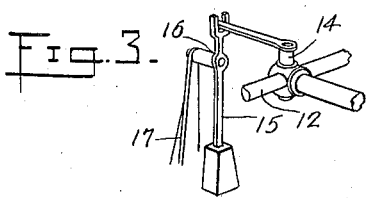
INVENTOR
Ramon Febres Corden
BY
ATTORNEYS

UNITED STATES PATENT OFFICE.

RAMÓN FEBRES CORDERO, OF RUBIO, VENEZUELA.

SAFETY DEVICE FOR MONORAILS.

1,015,140.        Specification of Letters Patent.        Patented Jan. 16, 1912.

Application filed April 6, 1911. Serial No. 619,202.

*To all whom it may concern:*

Be it known that I, RAMÓN FEBRES CORDERO, a citizen of the Republic of Venezuela, and a resident of Rubio, in the State of Tachira, Venezuela, have invented a new and Improved Safety Device for Monorails, of which the following is a full, clear, and exact description.

My invention relates to a novel means for maintaining a car in equilibrium on a monorail when the gyroscope or other stabilizing device is inoperable through accident or other cause.

An object of my invention is to construct an auxiliary stabilizing device for monorail cars, which is regulated or actuated by the movement of the body of the car out of its normal horizontal position.

A further object of my invention is to provide an emergency stabilizing device which under normal conditions will be withdrawn out of engagement with the track, thereby minimizing the friction between the parts of the car and the track.

A further object of my invention is to provide a device to automatically maintain a car in equilibrium on a monorail, by bracing said car from the side of the monorail.

I attain the above-outlined objects by disposing upon opposite sides of the monorail, pairs of compressed air cylinders, the pistons of which terminate in a roller bearing on the monorail. Compressed air is admitted to the cylinders on the depressed side by a swinging pendulum controlling the compressed air valves.

With the above and other objects in view, as will more fully hereinafter appear, the present invention consists in certain novel details of construction and arrangement of parts hereinafter fully described, illustrated in the accompanying drawings, and more particularly pointed out in the appended claims.

Reference is to be had to the accompanying drawings, forming a part of this specification in which similar characters of reference indicate corresponding parts in all the figures, and in which—

Figure 1 is a side elevation of a monorail car showing my invention applied thereto, parts of the side of said car being broken away to show the internal mechanism. Fig. 2 is a rear elevation of a car showing parts broken away to disclose the mechanism within the car, and Fig. 3 is a detailed perspective view showing the pendulum control for the compressed air valve.

In the figures, I have disclosed a common form of monorail car A, having trucks B and wheels C movable upon a monorail D. This car is, as usual, maintained in stable equilibrium by any form of gyroscope E actuated by a motor F connected to the gyroscope by belting G. To this extent, the car and its several parts are of the general monorail car construction.

Disposed on each of the opposite sides of the car truck is my improved stabilizing or safety device, and as these devices are the same for each pair of trucks and are the same on each side of the truck, but one set of stabilizers will be described, it being understood that these devices may be applied to the several trucks with whatever mechanical variations may be necessary to their installation.

Disposed beneath each outer edge of the framework 3 and equally spaced apart from a transverse medial line through the center of each of the trucks, is a pair of depending lugs 4. Pivoted to each of these lugs and extending downwardly and inwardly toward the monorail D, to form an inwardly bent and freely swinging V, is a pair of compressed air cylinders 5. Projecting from the lower ends of these cylinders are piston stems 6, the lower end of each of which is offset to form a bearing 7 for a roller 8, which roller is free to roll in a groove 9 in the base flange of the monorail D. The two stems are offset in opposite transverse directions, thereby bracing the wheel 8 in position between the lower ends of the two stems.

Within the cylinder 5 and rigidly affixed to the stem 6, is an ordinary form of piston head 10. Compressed air is conveyed from a reservoir tank 11 through a main conduit 12, from which conduit extends a series of branch conduits 13 leading to each of the cylinders 5. Disposed within the main conduit 12 is a common three-way valve 14, the stem of which is actuated by being positioned within the yoke on the upper end of a pendulum 15 fulcrumed at 16 to a standard 17. This valve is so arranged that as the pendulum swings to one side or the other relative to the car, to maintain its normally vertical position, it will open one way to admit compressed air to the depressed side of the car. The compressed air will therefore act on the head 10 and force the wheel 8 on the depressed side into engagement with the monorail, and by pressure on the rail will react on the body of the car, thereby tending to right the same. Should the car then swing beyond its normally horizontal position and tilt down on the opposite side, the compressed air will be admitted into the opposite side, and as the compressed air is of equal intensity on both sides, the effect will be to balance the car and maintain it in equilibrium. It is to be understood, of course, that normally the car is maintained in horizontal position by means of the gyroscope or other regular stabilizer, and that my improved device is intended only as an auxiliary to the gyroscope in case of an accident to this mechanism. In order to relieve the cylinders of this compressed air after having been once actuated as above described, the compressed air is released by means of a manually-operated valve 18 positioned convenient to the operator, the opening of which valve will restore the cylinders to an empty condition to be ready to receive the next charge of compressed air.

In order to keep the wheel 8 off the monorail when the car is in normal working order, there is disposed between the end 19 of the cylinder and the head 10 of the piston, a coil compression spring 20, which is of just sufficient strength to lift the stem 6 and roller wheel 8 off the monorail.

While a preferred embodiment of the invention has been described, it is understood that many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is intended to cover the full scope of the invention and is not to be given any narrower construction than the prior art demands, and that materials, sizes and relativities of parts are non-essential, except as called for in the claims.

Having thus described my invention, I claim as new and desire to secure by Letters Patent:

1. In a safety device for monorail cars, a pair of cylinders disposed in the form of a V on opposite sides of each car truck, a wheel journaled at the apex of the V and adapted to bear against one side of the monorail, a compressed fluid receptacle within the car, conduits leading from said receptacle to each of said cylinders, a valve controlling the passage of fluid through said conduits, and a freely swinging pendulum actuating said valve.

2. In a safety device for monorail cars, a pair of cylinders disposed in the form of a V on opposite sides of each car truck, a wheel journaled at the apex of the V and adapted to bear against one side of the monorail, a compressed fluid receptacle within the car, conduits leading from said receptacle to each of said cylinders, a valve controlling the passage of fluid through said conduits, a freely swinging pendulum actuating said valve, and manually-operated means releasing the fluid from said cylinders.

3. In a safety device for monorail cars, a compressed air actuating means engaging the monorail, said means reacting on the car to maintain the same in stable equilibrium, and means automatically controlling the air pressure in said means.

4. In a monorail car, a connection between the car and the rail on opposite sides of the car, said connection comprising a fluid cylinder, and means controlled by the position of the car with reference to the monorail, controlling the passage of the actuating fluid to said cylinder.

5. In a safety device for monorail cars, a series of braces between each side of the car and the corresponding side of the monorail, and means actuated by the transverse movement of the car on the monorail, controlling the length of said connecting braces.

6. In a stabilizing device for monorail cars, comprising a main stabilizing device, and an auxiliary stabilizing device, said auxiliary stabilizing device comprising braces disposed between the body of the car and the monorail, and means for elongating said bracing means when the car swings in a direction tending to shorten said bracing means.

7. In a car mounted on a monorail, a main stabilizing device, an auxiliary stabilizing device adapted to engage the monorail, and resilient means acting on said device to normally hold the same disengaged from the monorail.

8. In a car mounted on a monorail, a stabilizing device adapted to engage the monorail to restore the car in normal position on the monorail when it has been moved to an abnormal position.

9. In a monorail car mounted on a rail, a stabilizing device normally disengaged from the rail, and means actuated by the movement of said car from its normal position, to bring said device into engagement with said rail to return said car to its normal position.

10. In combination with a car, a supporting device normally in inoperative position, and means automatically actuated by the tilting of said car to bring said device into operative position to restore and support said car to its normal position.

In testimony whereof I have signed my name to this specification in the presence of two subscribing witnesses.

RAMÓN FEBRES CORDERO.

Witnesses:
W. S. ORTON,
J. P. DAVIS.